US009311937B2

(12) United States Patent
Zou et al.

(10) Patent No.: US 9,311,937 B2
(45) Date of Patent: Apr. 12, 2016

(54) SYSTEMS AND METHODS FOR CALIBRATING READ AND WRITE OPERATIONS IN TWO DIMENSIONAL MAGNETIC RECORDING

(71) Applicant: Marvell World Trade Ltd., St. Michael (BB)

(72) Inventors: Qiyue Zou, San Jose, CA (US); Michael Madden, Mountain View, CA (US); Gregory Burd, San Jose, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 14/331,553

(22) Filed: Jul. 15, 2014

(65) Prior Publication Data
US 2015/0022916 A1   Jan. 22, 2015

Related U.S. Application Data

(60) Provisional application No. 61/846,802, filed on Jul. 16, 2013, provisional application No. 61/846,812, filed on Jul. 16, 2013.

(51) Int. Cl.
*G11B 5/455* (2006.01)
*G11B 5/58* (2006.01)
*G11B 5/012* (2006.01)
*G11B 5/596* (2006.01)
G11B 5/48 (2006.01)
G11B 20/10 (2006.01)

(52) U.S. Cl.
CPC ............... *G11B 5/455* (2013.01); *G11B 5/012* (2013.01); *G11B 5/58* (2013.01); *G11B 5/59683* (2013.01); G11B 5/4886 (2013.01); G11B 5/59627 (2013.01); G11B 20/10 (2013.01)

(58) Field of Classification Search
CPC .... G11B 5/012; G11B 5/4886; G11B 5/5526; G11B 5/59683; G11B 5/59688; G11B 5/3945; G11B 20/10; G11B 20/10009; G11B 7/14; G11B 20/1217; G11B 20/22; G11B 5/455; G11B 5/58; H04B 1/71057
USPC ................ 360/31, 63, 75, 77.06, 65; 369/94, 369/47.19, 124.02
See application file for complete search history.

(56) References Cited

U.S. PATENT DOCUMENTS

| 5,412,518 | A   | * | 5/1995  | Christner et al. ............... 360/66 |
|-----------|-----|---|---------|----------------------------------------|
| 5,691,857 | A   |   | 11/1997 | Fitzpatrick et al.                     |
| 6,104,562 | A   |   | 8/2000  | Ottesen et al.                         |
| 6,826,140 | B2  | * | 11/2004 | Brommer et al. ............... 369/94  |
| 7,253,986 | B2  | * | 8/2007  | Berman et al. ............. 360/77.01   |
| 7,307,809 | B2  | * | 12/2007 | Neumann ................... 360/77.12   |
| 2004/0037202 | A1 |  | 2/2004  | Brommer et al.                         |
| 2007/0041121 | A1 |  | 2/2007  | Neumann                                |
| 2007/0047131 | A1 |  | 3/2007  | Berman et al.                          |

OTHER PUBLICATIONS

International Search Report and Written Opinion dated Dec. 8, 2014 for International Application No. PCT/US2014/046690, International Filing Date Jul. 15, 2014 consisting of 11 pages.

* cited by examiner

Primary Examiner — Ali Neyzari

(57) ABSTRACT

Systems and methods are provided for calibrating signals retrieved from a storage device using a first reader and a second reader. The systems and methods further include reading a first signal using the first reader and a second signal using the second reader. Control circuitry computes a calibration metric associated with the first reader and the second reader based on the combination of the first signal and the second signal. At least one of the first signal and the second signal is subsequently decoded based in part on the computed calibration metric.

20 Claims, 11 Drawing Sheets

SYSTEMS AND METHODS FOR CALIBRATING READ AND WRITE OPERATIONS IN TWO DIMENSIONAL MAGNETIC RECORDING

CROSS REFERENCE TO RELATED APPLICATIONS

This disclosure claims the benefit under 35 U.S.C. §119(e) of U.S. Provisional Application No. 61/846,802, filed on Jul. 16, 2013, and U.S. Provisional Application No. 61/846,812, filed on Jul. 16, 2013, each of which is incorporated herein by reference in its entirety.

FIELD OF USE

The present disclosure relates generally to systems and methods for calibrating read and write operations in hard disk drive (HDD) systems. More particularly, the disclosure discusses calibrating two read heads of a two dimensional magnetic recording (TDMR) system. Calibration of the two read heads with a write head is also discussed.

BACKGROUND OF THE DISCLOSURE

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted as prior art against the present disclosure.

The disclosed technology relates to hard disk drive technology, and more particularly, to calibrating read and write operations in a two dimensional magnetic recording (TDMR) system.

Demand for storage capacity is increasing and motivates the development of hard disk drive systems that can support higher storage capacity by increasing the recording density of the recording medium. However, in practical implementations, an increased recording density may present several design challenges. For example, the increased recording density may necessitate a reduced spacing between adjacent tracks of a hard disk. This may, in turn, cause a larger amount of cross-track interference that complicates the recording and retrieval of data as well as maintaining the data's integrity while stored.

TDMR has been considered as a technique for alleviating the increased level of cross-track interference introduced by increased recording density. While conventional hard disk drive systems employ a single read head for retrieving data from the disk, TDMR systems use multiple read heads that may be configured to concurrently retrieve data from the disk. For example, a simple case of a multi-read head TDMR system may consist of two read heads. The two read heads may retrieve data from adjacent tracks of the hard disk. Compared to the use of a single read head, the concurrent use of two read heads not only enables the retrieval of larger amounts of data per time unit, but also allows the cancellation of cross-track interference. By concurrently retrieving signals from two adjacent tracks, the cross-track interference caused by one of the tracks on the other track may be estimated and cancelled as part of the decoding process. Therefore, as cross-track interference can be a key limitation in hard disk drive systems, the use of TDMR has the potential to significantly improve hard disk drive performance and capacity. However, the use of TDMR in practical implementations faces several design challenges and requires enhanced calibration procedures to coordinate the concurrent access to the recording medium.

SUMMARY OF THE DISCLOSURE

In accordance with an embodiment of the present disclosure, a method is provided for calibrating signals retrieved from a storage device using a first reader and a second reader. The method includes reading a first signal using a first reader and a second signal using a second reader. A calibration metric is computed based on a combination of the first signal and the second signal, and at least one of the first signal and the second signal is decoded based in part on the computed calibration metric.

In some implementations, the first signal is associated with a first track of the storage device and the second signal is associated with a second track of the storage device.

In some implementations, the calibration metric comprises a time offset between the first signal and the second signal.

In some implementations, computing the calibration metric includes determining a first time period ranging from the first reader detecting a servo address mark to the first reader detecting a data address mark, determining a second time period ranging from the second reader detecting the servo address mark to the second reader detecting the data address mark, and computing a time offset based on the first time period and the second time period.

In some implementations, computing the calibration metric includes computing a phase relation between a first portion of the first signal and a second portion of the second signal to obtain a phase shift between the first reader and the second reader, and determining a time offset based on the phase shift.

In some implementations, the calibration metric includes a cross-track distance between the first reader and the second reader. Computing the calibration metric further includes estimating a position offset of the first reader relative to the second reader based on a reference signal, and computing an average of the position offset of the first reader relative to the second reader to obtain the calibration metric.

In some implementations, the decoding includes performing joint decoding of the first signal and the second signal based on the calibration metric.

In accordance with an embodiment of the present disclosure, a system is provided for calibrating signals retrieved from a storage device. The system includes a first reader configured to read a first signal, a second reader configured to read a second signal, and control circuitry configured to compute a calibration metric based on a combination of the first signal and the second signal. The system further includes a decoder configured to decode at least one of the first signal and the second signal based in part on the computed calibration metric.

In some implementations, the first signal is associated with a first track of the storage device, and the second signal is associated with a second track of the storage device.

In some implementations, the calibration metric includes a time offset between the first signal and the second signal.

In some implementations, the control circuitry is further configured to determine a first time period ranging from the first reader detecting a servo address mark to the first reader detecting a data address mark, and a second time period ranging from the second reader detecting the servo address mark to the second reader detecting the data address mark.

The control circuitry is further configured to compute a time offset based on the first time period and the second time period.

In some implementations, the control circuitry is further configured to correlate a first portion of the first signal and a second portion of the second signal to obtain a cross-correlation sequence, and to detect a peak in the cross-correlation sequence. The control circuitry is further configured to compute a time offset based on the detected peak of the cross-correlation sequence.

In some implementations, the first portion and the second portion correspond to one of a pseudo-random bit sequence and a sector sync marker.

In some implementations, the control circuitry is further configured to compute a phase relation between a first portion of the first signal and a second portion of the second signal to obtain a phase shift between the first reader and the second reader. The control circuitry is further configured to determine a time offset based on the phase shift.

In some implementations, the calibration metric includes a cross-track distance between the first reader and the second reader, and the control circuitry is further configured to estimate a position offset of the first reader relative to the second reader based on a reference signal and to compute an average of the position offset of the first reader relative to the second reader to obtain the calibration metric.

In some implementations, the control circuitry is configured to perform the decoding by performing joint decoding of the first signal and the second signal based on the calibration metric.

BRIEF DESCRIPTION OF THE DRAWINGS

The above and other aspects and potential advantages of the present disclosure will be apparent upon consideration of the following detailed description, taken in conjunction with the accompanying drawings, in which like reference characters refer to like parts throughout, and in which.

DETAILED DESCRIPTION

The present disclosure generally relates to calibrating the read operations of two or more read heads in a two dimensional magnetic recording (TDMR) system. The use of TDMR in practical implementations faces several design challenges. The read heads may be mounted at fixed positions on an arm. Depending on the arm's position, the read heads may be positioned at a skewed angle with respect to the tracks, which inevitably results in misalignment of signals retrieved from the disk. Such misalignment complicates the task of estimating and cancelling the interference during the decoding of the data. Moreover, coordinating read operations from and write operations to the recording medium becomes more complex when two read heads are used. Although TDMR systems retrieve data concurrently using two read heads, they typically employ a single write head, as in conventional magnetic recording systems. The unbalanced number of read and write heads may necessitate modifications to the calibration procedures for coordinating access to the recording medium. In one aspect, a calibration metric is determined based on signals retrieved by the two read heads, and decoding of the signals is performed based in part on the determined calibration metric. In another aspect, read operations performed by the read heads are calibrated with respect to write operations performed by a write head.

Figure 1:
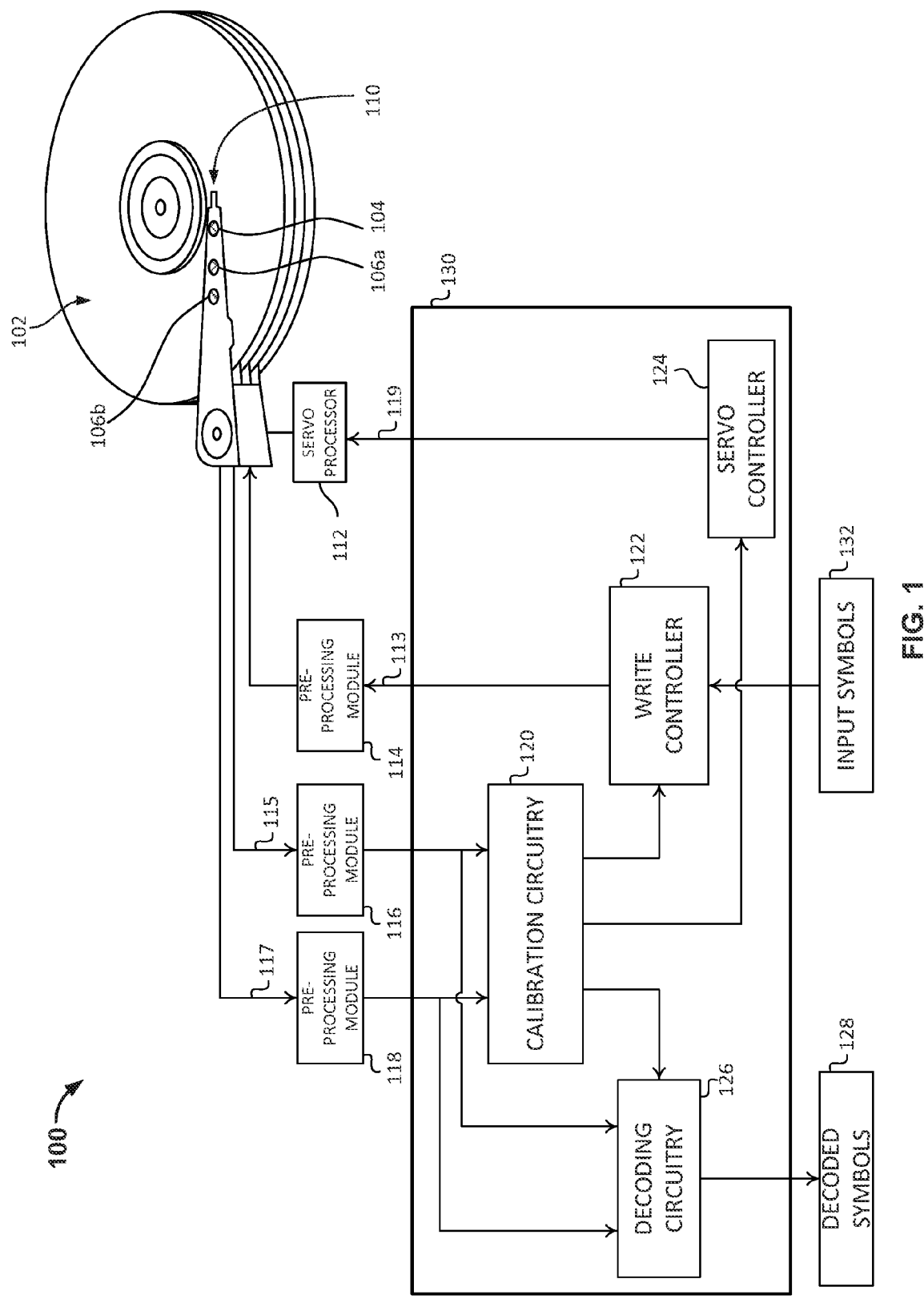
FIG. 1 illustrates a hard disk drive control system for two dimensional magnetic recording (TDMR), in accordance with some embodiments of the present disclosure.

FIG. 1 shows an illustrative hard disk drive system 100 using TDMR, in accordance with some embodiments of the present disclosure. Hard disk drive system 100 includes hard disk 102 and calibration and control interface 130. Calibration and control interface 130 may receive input symbols 132 to be written to hard disk 102 from an external device or external circuitry (not shown). Similarly, decoded symbols 128 may be provided to the external device or external circuitry by calibration and control interface 130. The external device may correspond to a computer motherboard, an audio device, a cellular phone, a portable media storage device, or any other suitable type of device.

Calibration and control interface 130 controls read operations from and write operations to hard disk 102. In a TDMR system, calibration and control interface 130 may concurrently receive two read signals, a first read signal 115 and a second read signal 117. First read signal 115 may correspond to a signal received from first read head 106a and second read signal 117 may correspond to a signal received from second read head 106b. First read head 106a and second read head 106b may both be located on actuator arm 110, arranged sequentially as shown in FIG. 1 or positioned in any other suitable manner. Alternatively, first read head 106a and second read head 106b may also be placed on separate actuator arms (not shown). Although the systems and methods described herein discuss concurrent read operations associated with two read heads, the concepts presented herein may be extended to any suitable number of read signals and read heads without departing from the scope of the present disclosure.

Calibration and control interface 130 may calibrate read operations performed by first read head 106a and second read head 106b (generally read heads 106) with write operations performed by write head 104. Calibration and control interface 130 may generate a write signal 113 based on input symbols 132 using write controller 122, and write head 104 may record the resulting signal on hard disk 102. Calibration and control interface 130 may further include a servo controller 124, which generates servo signal 119. Servo signal 119 may be used to control actuator arm 110, or it may control other operations of hard disk 102, such as the spinning of the magnetic disks.

Preprocessing modules 114, 116, and 118 may be used to convert or preprocess first read signal 115, second read signal 117, and write signal 121. Preprocessing may include amplification or attenuation of the signal, modifying the modulation or coding scheme used by the signal, or any other suitable transformation of the signals. Servo processor 112 may likewise perform conversion or preprocessing of servo signal 119 generated by servo controller 124.

Calibration and control interface 130 may include calibration circuitry 120, which receives first read signal 115 and second read signal 117 after both have been preprocessed. Calibration circuitry 120 may generate one or more calibration metrics based on the signal. The calibration metrics may include estimates of a time offset and/or a phase offset between first read head 106a and second read head 106b. Calibration circuitry may generate similar calibration metrics for write head 104, such as the time or phase offset between one of read heads 106 versus the write head 104, a position estimate in the cross-track direction, or any suitable combination thereof.

Calibration metrics generated by calibration circuitry 120 may be passed on to decoding circuitry 126, which may use these estimates to perform decoding of preprocessed first signal 115 and preprocessed second signal 117. For example, decoding circuitry 126 may use the calibration metrics to estimate the amount of cross-track interference between first signal 115 and second signal 117. By employing joint demodulation techniques, decoding circuitry 126 may estimate the interference that is generated by a symbol on one of the tracks to the other track. An estimate of the symbol to be decoded may be generated and the cross-track interference may be cancelled, similar to interference cancellation in wireless receivers. Upon completion of the decoding process, decoding circuitry 126 may generate decoded symbols 128 as output.

Write controller 122 may receive various calibration metrics from calibration circuitry 120 in order to coordinate write operations using write head 104 with read operations using read heads 106. In some embodiments, write head 104 may take into account the time offset between reader 106a and write head 104 when recording symbols on the medium. For example, write controller 122 may cause write head 104 to write adjacent tracks with a predefined time offset that is substantially similar to the time offset that exists between first read head 106a and second read head 106b. In this way, the writer may effectively pre-compensate for the time offset between read heads 106, and the need for calibration when reading from hard disk 102 may be reduced.

Servo controller 124 may receive calibration metrics from calibration circuitry 120 in order to facilitate read and write operations performed on hard disk 102. For example, servo controller 124 may be responsible for controlling the spinning of the magnetic disks, and it may perform various synchronization procedures with respect to the servo information that is recorded on the disk.

Figure 2:
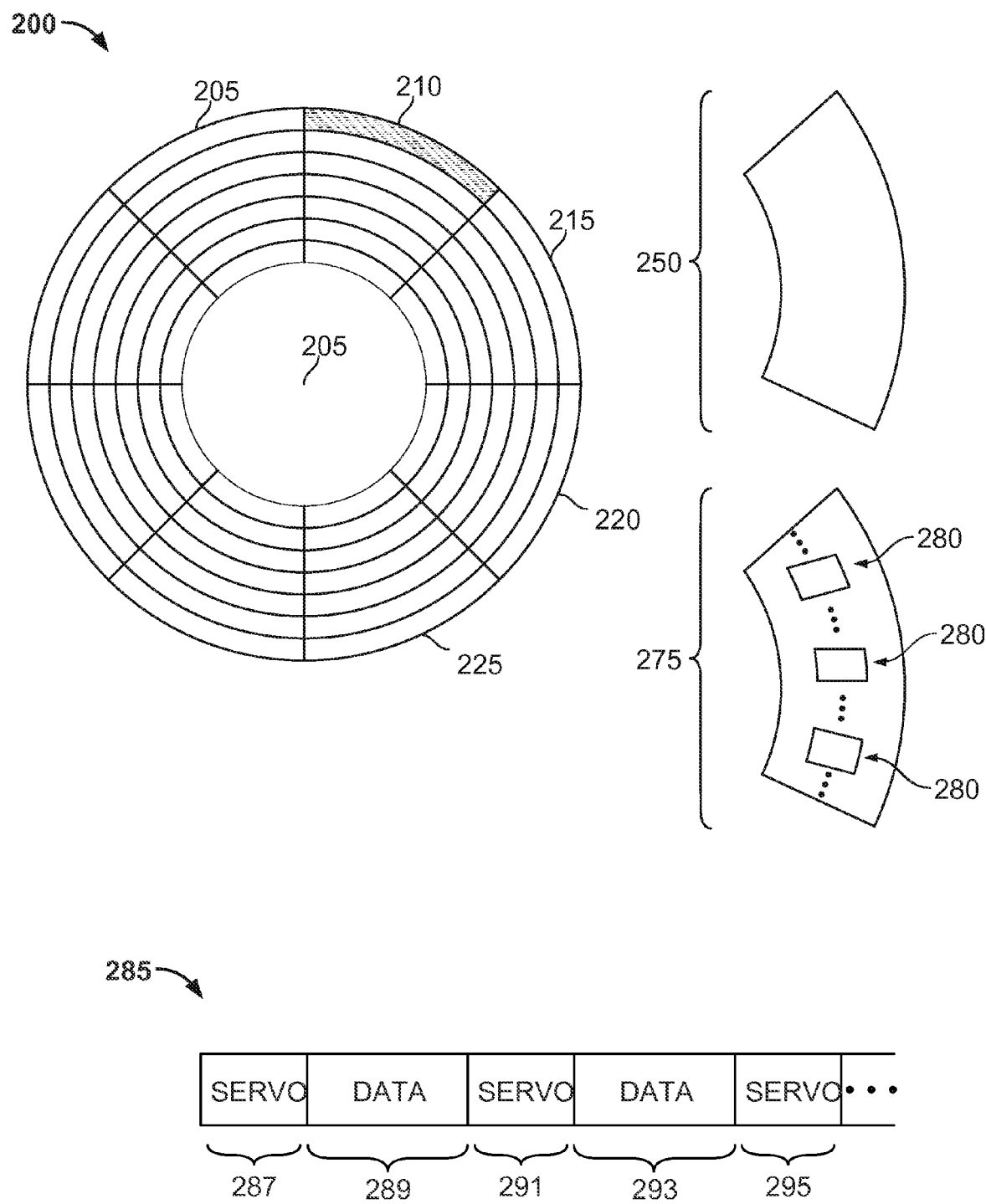
FIG. 2 illustrates formats of continuous and discrete media, in accordance with some embodiments of the present disclosure.

FIG. 2 shows illustrative formats of continuous and discrete media in accordance with an embodiment of the present disclosure. Medium 200 may correspond to a single magnetic disk (i.e., a platter) that is part of hard disk 102. Area 205 of medium 200 is unused for data storage and retrieval. Medium 200 is (logically) divided into a series of concentric rings, referred to as tracks, and each track includes multiple data wedges and servo wedges. FIG. 2 is meant to be illustrative only. In practice, there are typically many more tracks on the medium, and many more wedges per track (both servo and data wedges), than depicted in FIG. 2. Further, the unused portion of medium 200 in practice may either be larger or smaller than the relative size of area 205 to the area of medium 200. For example, in an arrangement, the width of a track is on the order of 5-10 microns, and the length of a sector is on the order of 500-1000 microns.

Wedge illustration 250 depicts a magnetic structure of a wedge area when medium 200 corresponds to a continuous medium. In this case, the magnetization in the area depicted in wedge illustration 250 is approximately uniform. A wedge according to wedge illustration 250 may be created using, e.g., magnetic grains or a continuous magnetic medium.

Wedge illustration 275 depicts a magnetic structure of a sector when medium 200 corresponds to a discrete (or "printed") medium. Wedge illustration 275 depicts a structure that that may be used by a system, e.g., hard disk control system 100 (FIG. 1). As shown in FIG. 2, wedge illustration 275 includes discrete magnetic regions, referred to as magnetic islands 280, with non-magnetic material between the islands.

Discrete media may be advantageous compared to continuous media in increasing the data density available in a given media format and/or reducing noise and other artifacts associated with the storage and retrieval of data. Discrete media typically require careful synchronization of a writing mechanism (e.g., write head 104 in FIG. 1) and the bit-level magnetic islands in media (e.g., magnetic islands 280 of medium 200) in order to properly write to the medium.

As depicted in FIG. 2, medium 200 is partitioned into data and servo wedges (referred to also as "wedge servo" form), and servo information is recorded in alternating wedges of media 200. In practice, the width of a servo wedge, e.g., servo wedge 205 or 215, is smaller than the width of a data wedge, e.g., data wedge 210. Data wedges are further subdivided into sectors, while servo wedges typically contain servo payload.

Track format 285 illustrates a format of a track of data from medium 200 according to an arrangement. Track format 285 shows alternating sections of servo information, i.e., servo information 287, 291, and 295 and data information, i.e., data information 289 and 293. Servo information 287, 291, and 295 may correspond to servo information from a single track of data from servo wedges 205, 215, and 225, respectively. Similarly, data information 289 and 293 may correspond to data information from the same single track of data, but from data wedges 210 and 220, respectively.

The "servo wedge" logical partitioning of medium 200 is only one possible partition for which the disclosed techniques are applicable, and other forms of partitioning medium 200 may be considered without departing from the scope of the present disclosure, such as interleaving servo symbols and data symbols throughout a track.

Figure 3:
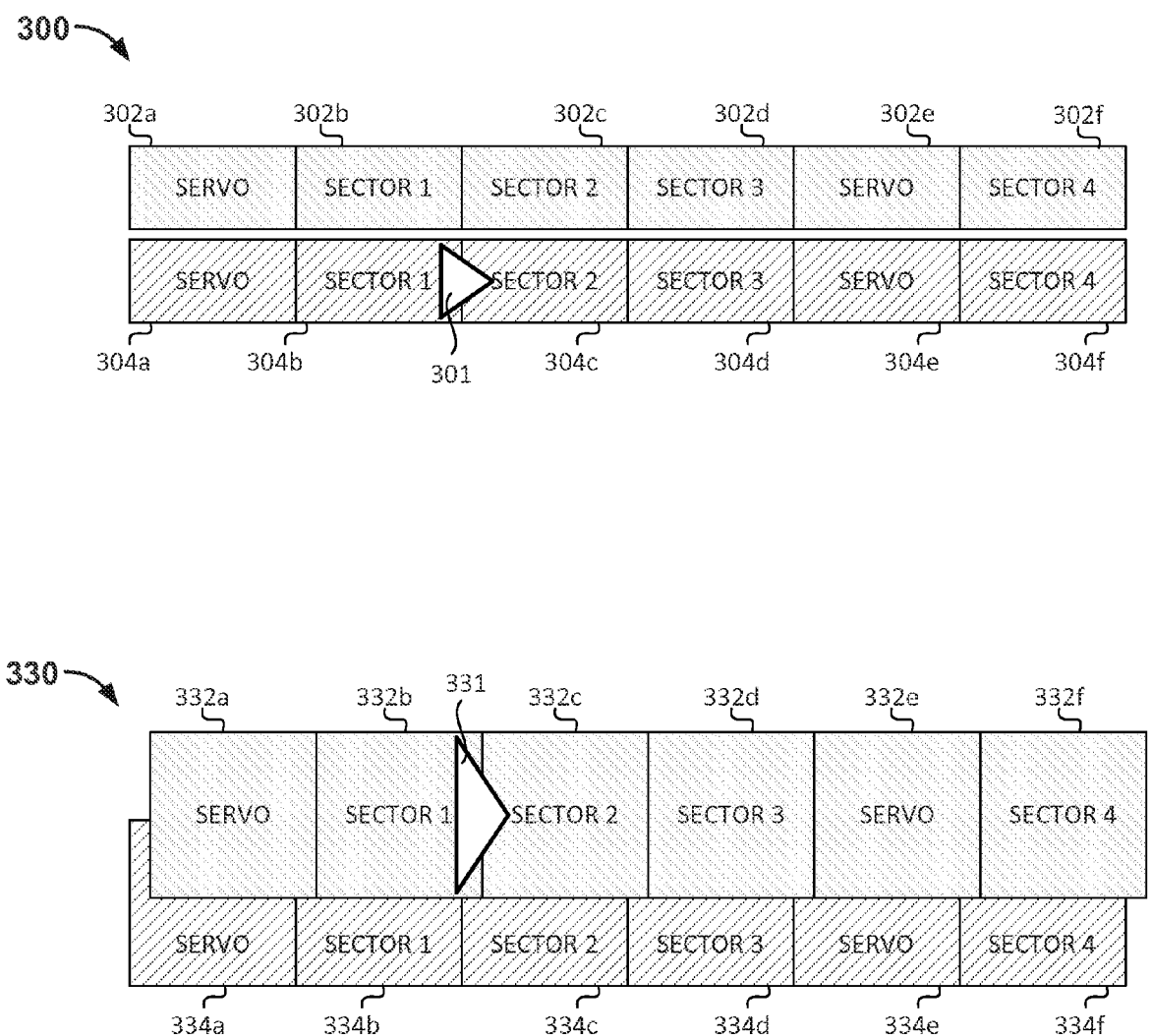
FIG. 3 illustrates formats for regular and shingled magnetic recording, in accordance with some embodiments of the present disclosure.

FIG. 3 illustrates formats for regular and shingled magnetic recording, in accordance with some embodiments of the present disclosure. Diagram 300 illustrates regular magnetic recording, which may write two adjacent tracks, first track 302a-302f (generally first track 302) and second track 304a-304f (generally second track 304), using write head 301.

Track 302 consists of servo information written at 302a and 302e and sector information written at 302b-302d and 302f. Track 304 consists of servo information written at 304a and 304e and sector information written at 304b-304d and 304f. Other sector formats, e.g., sector formats with fewer or more sector wedges between adjacent servo wedges, may be considered without departing from the scope of the present disclosure.

In regular magnetic recoding, write head 301 has substantially similar width as tracks 302 and 304. Write head 301 may be designed such that when adjacent tracks are recorded on the hard disk, tracks are sufficiently insulated from each other. In this manner, a large amount of cross-track interference, i.e., interference between adjacent tracks 302 and 304, may be avoided.

Diagram 330 illustrates shingled magnetic recording, which utilizes a write head 331, which may be wider than write head 301 and records data with a width that is larger than the desired track width. In shingled magnetic recording, the desired track width is instead achieved by recording over portions of previously recorded tracks, similar to the way shingles are arranged on a roof. For example, a first track 334a-334f (generally first track 334) may be recorded first. Subsequently, adjacent track 332a-332f (generally adjacent track 332) may be recorded such that it partially overlaps with track 334. The overlap between the tracks may be approximately half of the width of write head 331, although any suitable overlap may be employed. In some implementations, shingled magnetic recording may have the benefit of allowing higher recording densities because it alleviates design constraints associated with write head 301. Specifically, in regular magnetic recording, write head 301 needs to be designed such that only a limited amount of interference is created on tracks that are adjacent to the track being recorded. In contrast, in shingled magnetic recording, the amount of interference only needs to be constrained such that the desired amount of overlap between tracks is not exceeded. However, interference on tracks above track 332 (not shown) need not be taken into account because these locations of the hard disk are going to be overwritten when recording later tracks.

Although shingled magnetic recording may allow a higher recording density due to the "shingled" arrangement of tracks on hard disk 102, the higher recording density generally leads to a larger degree of cross-track interference between adjacent tracks. Such cross-track interference may be reduced in a TDMR system by reading adjacent tracks concurrently and cancelling cross-track interference through decoding methods.

Figure 4:
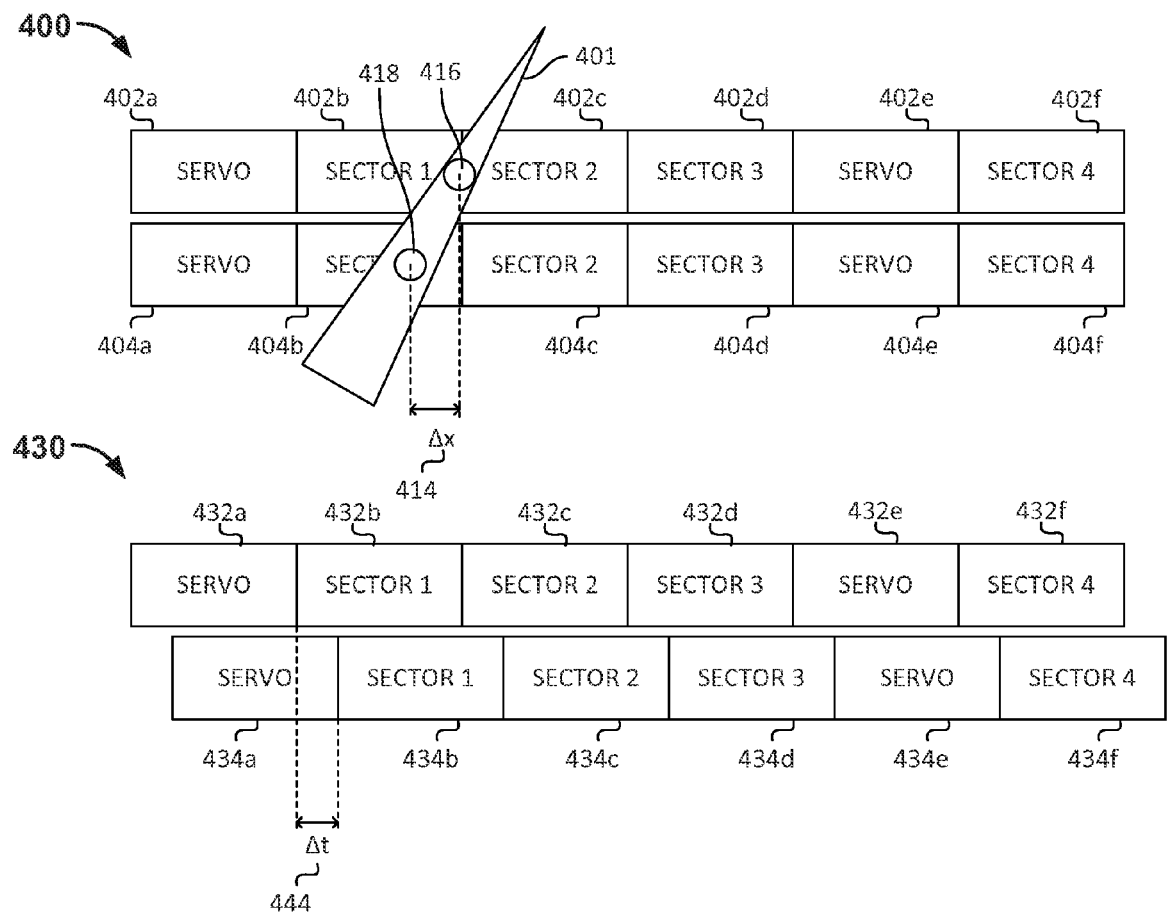
FIG. 4 illustrates a read procedure in a two dimensional magnetic recording (TDMR) system, in accordance with some embodiments of the present disclosure.

FIG. 4 illustrates a read procedure in a two dimensional magnetic recording (TDMR) system, in accordance with some embodiments of the present disclosure. Diagram 400 illustrates a spatial domain representation of a read procedure, in which actuator arm 401, which may correspond to actuator arm 110 in FIG. 1, is positioned over two adjacent tracks of hard disk 102. Actuator arm 401 may include read heads 416 and 418, which may correspond to read heads 106 in FIG. 1. Actuator arm 401 may be positioned such that read head 416 is positioned over first track 402a-402f (generally first track 402) and such that read head 418 is positioned over second track 404a-404f (generally second track 404). In this manner, read heads 416 and 418 may concurrently retrieve symbols recorded on first track 402 and second track 404, respectively. In some implementations, and as shown in FIG. 4, actuator arm 401 may be positioned in a skewed manner, such that one of the read heads is advanced in the horizontal direction compared to the other. This reader-to-reader gap 414 results in a time offset between the signals retrieved by first reader 416 and second reader 418, because symbols that are aligned vertically on tracks 402 and 404 are not retrieved at the same time.

Diagram 430 illustrates a time domain representation of the same read procedure shown in diagram 400. In particular, diagram 430 shows the signals retrieved by first reader 416 and second reader 418. Due to the reader-to-reader gap 414, there may be a time delay 444 between the signals. In accordance with some embodiments of the present disclosure, time delay 444 may be estimated and used during the process of mitigating cross-track interference as part of the decoding process. For example, as is discussed in relation to FIG. 1, calibration and control interface 130 may include calibration circuitry 120, which estimates the time delay between the first reader's signal and the second reader's signal. This time delay may be provided by calibration circuitry 120 to decoding circuitry 126 for use in the decoding process. The time delay may also be provided to write controller 122 and servo controller 124.

In some implementations, calibration circuitry 120 may quantify time delay 444 in units of a symbol duration. Time delay 444 may further be broken down into an integer component and a fractional component. For example, the integer component may quantify time delay 444 in terms of an integer multiple of the symbol duration, whereas the fractional component may correspond to a remaining fraction of the symbol duration. Together, integer component and fractional component amount to time delay 444 in units of the symbol time. In some embodiments, the integer component may be referred to as "time offset" (or alternatively as reader-to-reader gap), while the fractional component may be referred to as "phase offset" (or alternatively as reader-to-reader phase delta). Time offset and phase offset may be estimated jointly or separately by calibration circuitry 120. Implementations that estimate time offset and phase offset separately, may estimate these parameters with different time periodicities. For example, an estimate of the time offset may be updated less frequently than an estimate of the phase offset, because the time offset reflects the integer component of time delay 444 which is expected to fluctuate less than its fractional component (i.e., the phase offset).

In accordance with some embodiments of the present disclosure, calibration procedures may be used to estimate the time offset. As is discussed in relation to FIG. 3, a shingle writer may record a track 332, which may have a width of approximately twice the desired track width. Before the shingled write operation overwrites this track, the read heads may be used to retrieve the information recorded on the disk. Accordingly, due to the sufficiently large width of the shingled writer, both the first read head and the second read head will retrieve substantially similar information, although subject to time delay 444 that results from the skewed arrangement of the read heads on actuator arm 401, as is discussed in relation to FIG. 4. In other words, the signal retrieved by the first reader and the signal retrieved by the second reader will be substantially similar but offset in time.

In some implementations, the signals retrieved by the first read head and the second read head may be correlated, and a peak of the cross-correlation signal may be identified. Peaks of the cross-correlation signal for a given time offset may indicate that time alignment between the signals is achieved for the given time offset. Accordingly, time delay 444 may be determined by identifying peaks of the cross-correlation function of the first signal and the second signal. The accuracy with which peaks can be identified depends on the type of signal that was recorded by shingled writer 331. To improve the accuracy of the time alignment process, shingled writer 331 may record a pseudo random bit sequence (PRBS). When retrieved by read heads 416 and 418, this pseudo-random bit sequence may have favorable cross-correlation properties, in terms of exhibiting a high cross-correlation when aligned, and a small cross-correlation otherwise.

In some implementations, the time offset may be obtained by determining a time difference between detecting a servo address mark (SAM) and a data address mark (DAM). In particular, a shingled writer may be used to record a track consisting of a synchronization marker and a data sector. Before the shingled write operation overwrites a portion of the recorded track, read heads 416 and 418 are used to retrieve the recorded data. The signals retrieved by first reader 416 and second reader 418 are analyzed and timestamps are assigned to the following events: (1) detection of the SAM by first reader 416; (2) detection of the SAM by second reader 418; (3) detection of the DAM by first reader 416; and (4) detection of the DAM by second reader 418. Based on the above four timestamps, time delay 444 may be determined by comparing the above time stamps. In some embodiments, it may suffice to compare the third and the fourth timestamps to determine time delay 444. For example, time delay 444 may be determined based on the time difference between detecting the DAM by first read head 416 and second read head 418.

The above methods for determining the time offset are meant to serve as examples and may be used in any suitable combination to determine the time offset without departing from the scope of this disclosure. The calibration of the time offset may be performed periodically (e.g., with a predefined period), but it may also be performed only sporadically, for example during the manufacturing of hard disk 102.

The calibration procedures described above may be used to accurately determine the time offset, but may be insufficient for determining the phase offset, because the first signal and the second signal are both associated with symbol-level granularity. Therefore, the cross-correlation function of the first signal and the second signal may be limited to symbol-level granularity as well.

In accordance with some embodiments of the present disclosure, systems and methods for determining the phase offset are provided. Calibration of the phase offset may need to be performed more frequently than calibration of the time offset because the fractional component of time delay 444 may vary more rapidly than the integer component. The variations may be due to various sources, including changes in temperature, variations of the "fly height" of read heads 416 and 418, and other factors. For example, calibration of the phase offset may be performed on a per wedge basis.

In some implementations, the phase offset may be determined by using the first and the second read heads to retrieve a common preamble pattern. For example, a Write Zero Phase Start (WZPS) field may be used. A WZPS field is a timing preamble pattern written one time or printed onto the disk. A wedge may have one or multiple WZPS fields. In particular, each of the symbols of the first and second read signals, may be associated with a phase value, which may be demodulated and expressed as an angle measured in radians, degrees, or some other suitable unit. Alternatively or additionally, some implementations may determine the sine and cosine of the demodulated angle, in accordance with Euler's formula, $$e^{j\theta} = \cos\theta + j\sin\theta,$$

where $\theta$ denotes the phase offset. The above equation illustrates that the sine and cosine components of the phase offset are sufficient for determining the phase offset without ambiguity.

The demodulated phase offset, or alternatively its sine and cosine components, may be computed and averaged over a number of symbols, for example the symbols in the preamble pattern. In some implementations, performing the averaging across the sine and cosine components of the phase offset may be advantageous, because it may be easier to implement or favorable from a numerical perspective. In some implementations, a Fourier transform (e.g., computed using a Harmonic Sensor Circuit (HSC) block) may be used to perform phase demodulation of the retrieved signals. The Fourier transform may provide accumulated sine and cosine sums, which may be used by calibration and control interface 130 to determine the phase offset for calibration.

Figure 5:
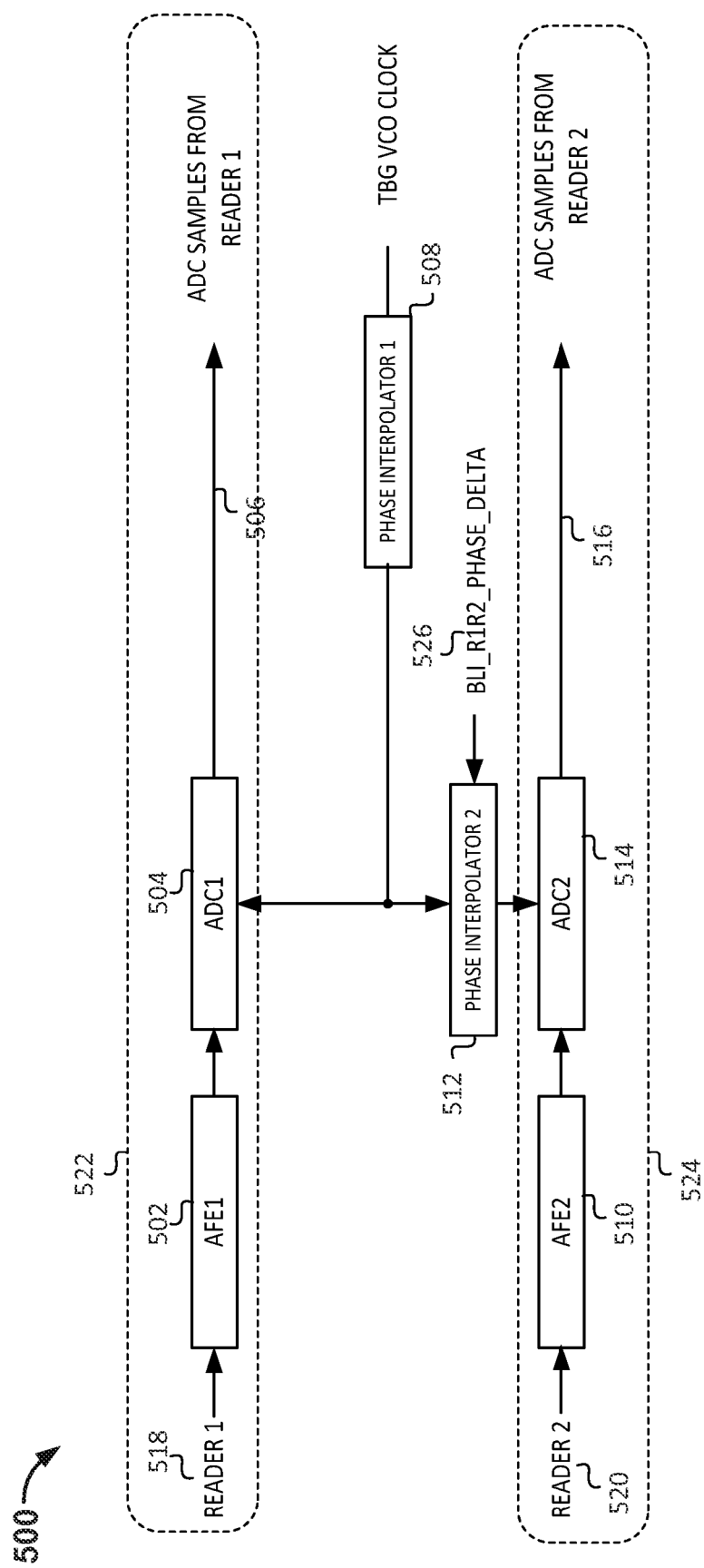
FIG. 5 is a block diagram of phase adjustment circuitry in a two dimensional magnetic recording (TDMR) system, in accordance with some embodiments of the present disclosure.

FIG. 5 is a block diagram of phase adjustment circuitry in a TDMR system, in accordance with some embodiments of the present disclosure. Phase adjustment circuitry 500 may include signal paths 522 and 524, which process the first reader's signal and the second reader's signal, respectively. Each path includes an analog front end (i.e., analog front ends 502 and 510), and an analog-to-digital converter (i.e., analog-to-digital converters 504 and 514). Both signal paths may operate based on a common system clock (i.e., Time Based Generator (TBG) voltage-controlled oscillator (VCO) clock 522). A first phase interpolator 508 may be used to compensate for a time delay that is common to the first reader's signal 518 and the second reader's signal 520. For example, this common time delay may be relative to a reference time associated with servo or training symbols that are retrieved from hard disk 102. This common time delay may also be relative to a reference time associated with the first reader's signal. Second phase interpolator 512 may compensate for a differential time delay between the first reader's signal 518 and the second reader's signal 520. This differential time delay may be due to the skewed arrangement of read heads 106a and 106b that results in time delay 444, as is discussed in relation to FIG. 4. Second phase interpolator 512 may compensate for time delay 444 based on signal 526, which includes an estimate of time delay 444.

Analog-to-digital converters 504 and 514 respectively provide signals 506 and 516 as output. After analog-to-digital conversion and appropriate correction of the common and differential time delays, signals 506 and 516 may be further processed (not shown). The further processing may include processing by calibration circuitry 120 to determine updated estimates of the common and differential time delays. Additionally or alternatively, signals 506 and 516 may be processed by decoding circuitry 126 to obtain decoded symbols. In some embodiments, servo information may be extracted from signals 506 and 516 by servo controller 124.

Figure 6:
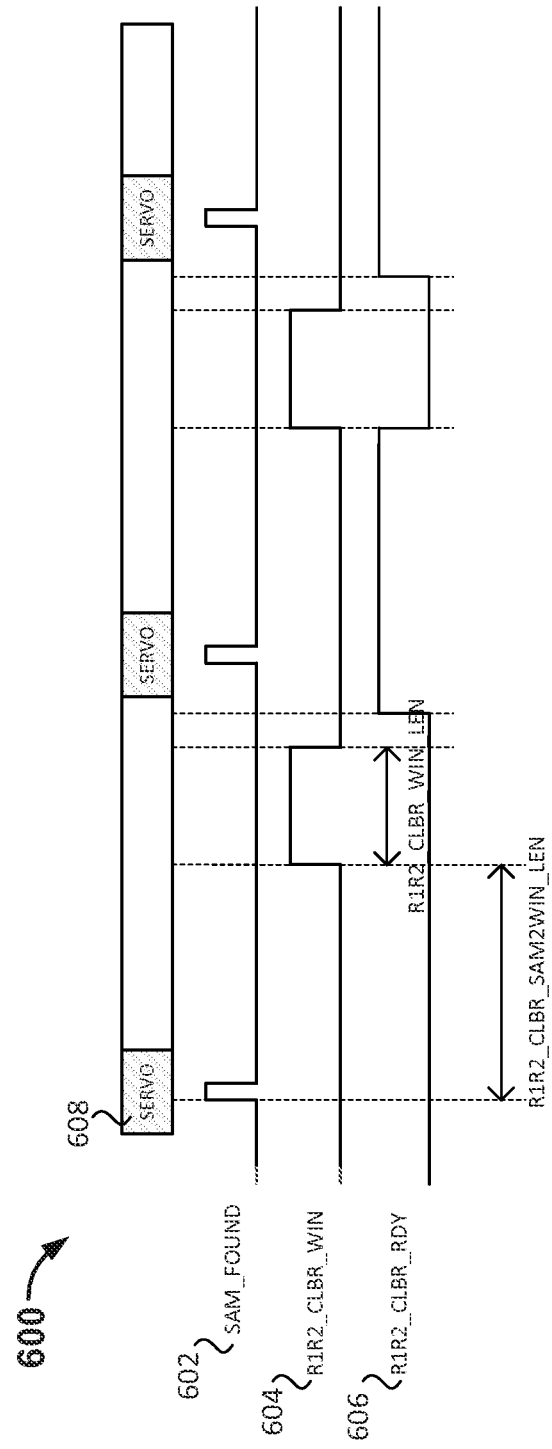
FIG. 6 illustrates a phase synchronization protocol, in accordance with some embodiments of the present disclosure.

FIG. 6 shows a diagram 600 of a phase synchronization protocol used by the read channel (RDC) in a hard disk controller, in accordance with some embodiments of the present disclosure. The phase synchronization protocol may include a number of gating signals. Synchronization gating signal 602 may be used to indicate when a synchronization address mark (SAM) has been detected. The peaks in the gating signal may not necessarily coincide with the beginning of a SAM region 608 because calibration and control circuitry 130 may require some time to process the SAM. Synchronization gating signal 602 may also be denoted "SAM_FOUND." Calibration window gating signal 604 may indicate when calibration and control circuitry 130 should start accumulating phase value measurements or alternatively sine and cosine sums. The duration during which calibration window gating signal 604 is active may be denoted "R1R2_CLBR_WIN." The delay between the SAM_FOUND event of synchronization gating signal 602 and the start of the calibration window 610 may be denoted by parameter "R1R2_CLBR_SAM2WIN_LEN." Calibration status gating signal 606 may indicate when the phase offset estimate has been determined. There may be some delay from the end of the calibration window until calibration status gating signal 606 becomes active because of processing delays.

Figure 7:
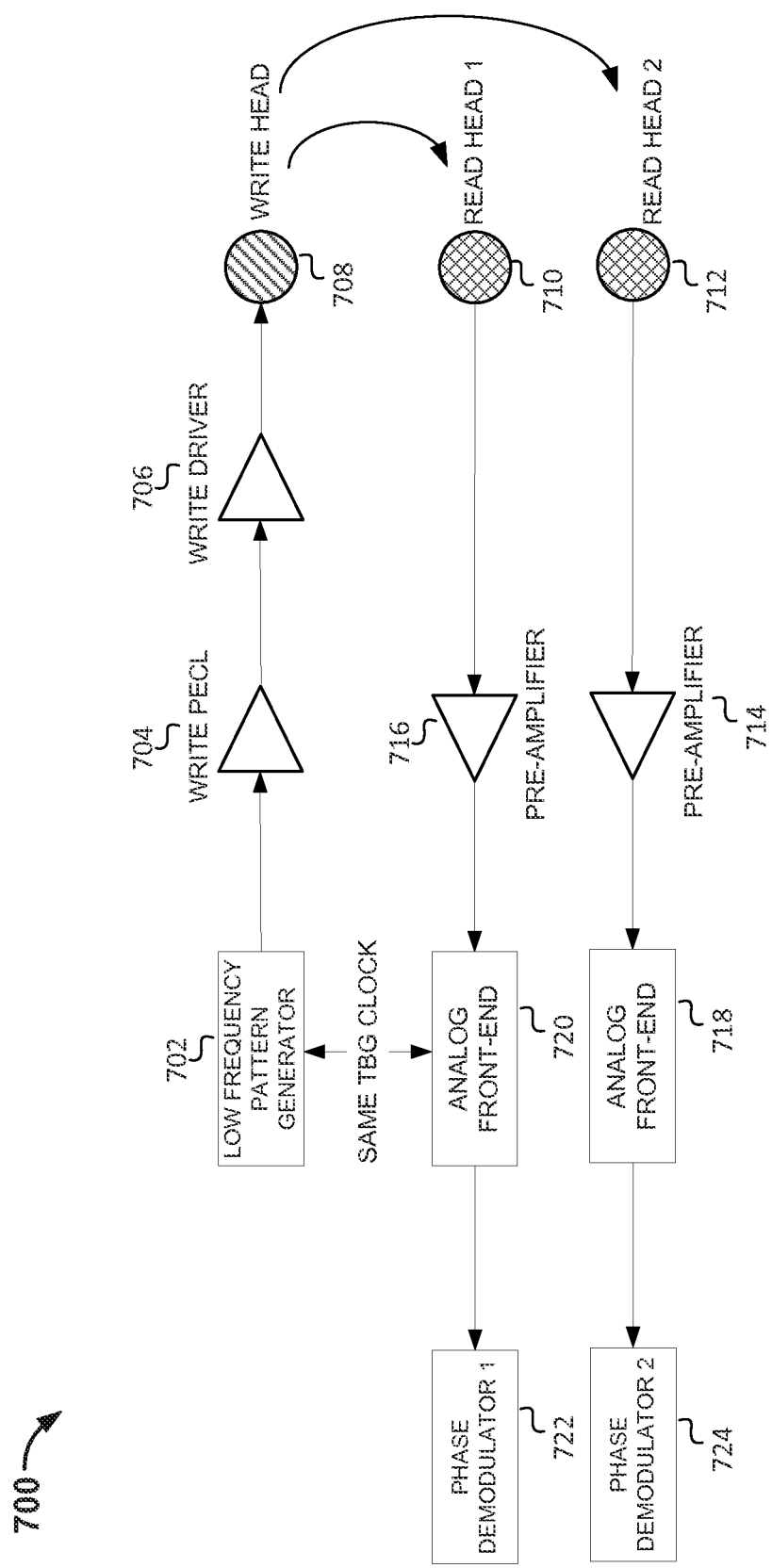
FIG. 7 illustrates circuitry for obtaining phase synchronization parameters using loopback calibration in a two dimensional magnetic recording (TDMR) system, in accordance with some embodiments of the present disclosure.

FIG. 7 shows calibration circuitry for obtaining phase synchronization parameters using a loopback procedure, in accordance with some embodiments of the present disclosure. The loopback calibration may be used to monitor the change in the phase offset between the first reader and the second reader. Loopback calibration circuitry 700 may be part of calibration and control interface 130, as is discussed in relation to FIG. 1. In particular, low-frequency pattern generator 702 generates a periodic and known low-frequency data pattern. The generated pattern may be amplified by write Pseudo-Emitter Coupled Logic (pECL) 704 and write driver 706. The resulting amplified signal is transmitted to write head 708, which records the signal on hard disk 102. The recorded signal is read by first read head 710 and second read head 712 and amplified by pre-amplifiers 716 and 714, respectively. The amplified signal is then processed by analog front-ends 718 and 720, which utilize the same clock (e.g., the same TBG clock) as low-frequency pattern generator 702. Phase demodulators 724 and 722 respectively demodulate the signals processed by analog front-ends 718 and 720.

In some implementations, loopback calibration procedure 700 may be performed once per wedge to obtain an estimate of the phase offset $\theta_1$ of the first reader and an estimate of the phase offset $\theta_2$ of the second reader. The differential phase offset between the first and the second reader may then be obtained as $\theta_2-\theta_1$. Calibration and control circuitry 130 may compute this phase offset on a per wedge basis and compare the phase offset with a phase offset that has been computed during an initial calibration procedure. Denoting the initial phase estimate of the first reader as $\theta_{1,init}$, and the initial phase estimate of the second reader as $\theta_{2,init}$, the initial differential phase offset may be expressed as $\theta_{2,init}-\theta_{1,init}$. The initial differential phase offset estimate may be compared with the differential phase offset estimate obtained using the loopback procedure on a per-wedge basis. In some embodiments, the update may be performed in response to determining that the differential phase offset estimate obtained using the loopback procedure deviates from the initial differential phase offset estimate by more than a predefined amount. The difference between $\theta_2-\theta_1$ and $\theta_{2,init}-\theta_{1,init}$ may indicate the change in the phase offset between the first reader and the second reader.

Figure 8:
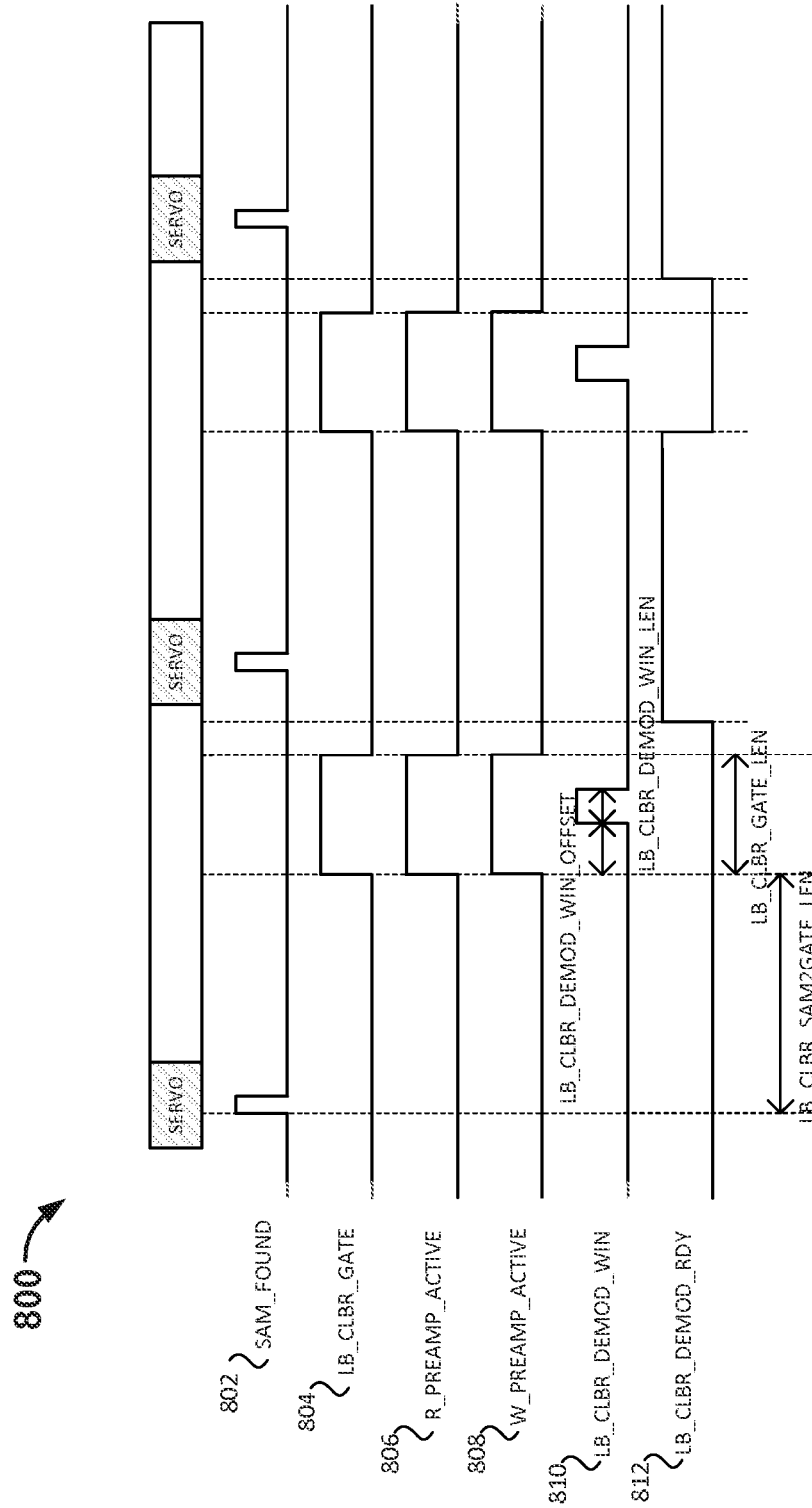
FIG. 8 illustrates a phase synchronization protocol used by a loopback calibration module, in accordance with some embodiments of the present disclosure.

FIG. 8 shows a diagram 800 of a phase synchronization protocol used by a loopback calibration module, in accordance with some embodiments of the present disclosure. The phase synchronization protocol may include a number of gating signals. Synchronization gating signal 802 may be used to indicate when a SAM has been detected. As is discussed in relation to FIG. 6, the peaks in the gating signal may not necessarily coincide with the beginning of a SAM region because calibration and control circuitry 130 may require some time to process the SAM. Synchronization gating signal 802 may also be referred to as "SAM_FOUND." Calibration window gating signal 804 may indicate when loopback calibration circuitry 700 should perform phase offset measurements. The time duration from triggering synchronization gating signal 802 to triggering the calibration window gating signal 804 may expressed by "LB_CLBR_SAM2GATE_LEN." This time duration may be needed to allow any transitory signals or spurious emissions to settle in order to perform an accurate measurement. Calibration window gating signal 804 may also trigger the operation of read amplifiers 716 and 714 as well as write amplifiers 706 and/or write pECL 704. Alternatively or additionally, separate gating signals may be provided to perform this function, such as read preamplifier gating signal 806 (or "R_PREAMP_ACTIVE"), and write preamplifier gating signal 808 ("W_PREAMP_ACTIVE").

The phase measurement performed by loopback calibration circuitry 700 may be performed during a portion of the calibration window. For example, measurements may be taken only during a predefined amount of time after read amplifiers 714 and 716 as well as write amplifiers 704 and 706 have been turned on by read amplifier gating signal 806 and write amplifier gating signal 808. The predefined amount of time may be given by a parameter "LB_CLBR_DEMOD_WIN_OFFSET," and may help to avoid inaccurate measurement due to spurious emissions of read amplifier and write amplifier. The actual phase measurements may be taken during a time window of length "LB_CLBR_DEMOD_WIN_LEN," which may be defined by calibration window gating signal 810. After the phase measurement has been performed, loopback calibration circuitry 700 may require some processing time for determining the phase offset based on the gathered measurement. A calibration status gating signal 812 (also referred to as "LB_CLBR_DEMOD_RDY") may indicate the availability of the estimated phase offset parameter.

It should be understood that phase synchronization protocol 800 may be implemented in various other ways without departing from the scope of the present disclosure. For example, a subset of the gating signals may be used, and some of the warm-up or processing periods may be reduced or avoided.

Figure 9:
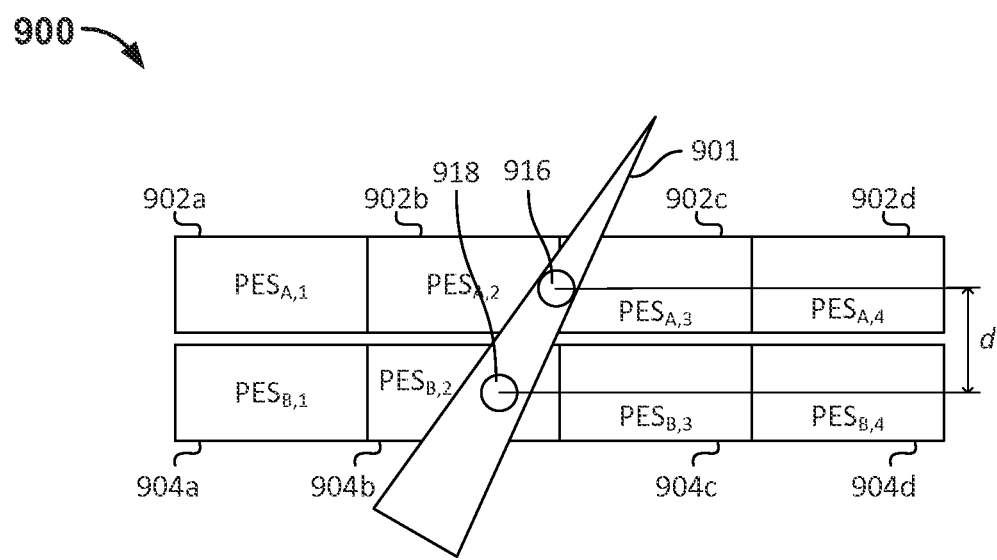
FIG. 9 illustrates a method for calibrating the cross-track distance between two readers in a two dimensional magnetic recording system, in accordance with some embodiments of the present disclosure.

FIG. 9 shows a diagram 900 that illustrates calibration of the cross-track distance between two readers in a TDMR system, in accordance with some embodiments of the present disclosure. Actuator arm 901 includes first read head 916 and second read head 918, both of which may be similar to first read head 416 and second read 418 of FIG. 4. Actuator arm 901 may be positioned such that first read 916 retrieves a signal from first track 902a-902d (generally first track 902) and second read head 918 retrieves a signal from second track 904a-904d (generally second track 904). First track 902 and second track 904 may be adjacent to one another. Calibration of the cross-track distance may be performed using a specific type of reference signal, such as a position estimation signal (PES). The PES may be present in several wedges of hard disk 102, for example in wedges 902a-902d and 904a-904d. For each wedge, a number of symbols may be present whose value is known by calibration circuitry 120. Accordingly, each of these symbols may be used for deriving a cross-track position estimate. The cross-track position estimate may be measured as a vertical distance from the center of the track. In a non-TDMR implementation, the cross-track distance estimates may be derived for each wedge or for each symbol and averaged to obtain a resulting position estimate. The error variance associated with the averaged position estimate may depend on the number of wedges or symbols that are available. For example, assuming that position estimates $\hat{y}_{A,1}, \hat{y}_{A,2}, \hat{y}_{A,3},$ and $\hat{y}_{A,4}$ are available for wedges 902a-902d, respectively, an averaged estimate $$\hat{y}_A = \frac{1}{4}\sum_{i=1}^{4}\hat{y}_{A,i}$$

may be obtained for track 902. When each position estimate is unbiased but associated with a certain error variance, the accuracy of the averaged position estimate $\hat{y}_A$ may be higher than the accuracy of each individual position estimate, because the averaging reduces the error present in each individual position estimate.

In TDMR systems, position estimates may be derived separately for first read head 916 and second read head 918, and the accuracy of the averaged position estimate may be improved by combining both sets of estimates. In particular, if the exact vertical distance d between first read head 916 and second read head 918 is known, then the position estimate for second read head 918 provides information about the position of the first read head 916, because both read heads are arranged in a fixed and known manner on actuator arm 901. This information may be taken into account by averaging across the position estimates associated with both read heads instead of averaging the position estimates associated with each of the read heads separately. For example, assume that position estimates $\hat{y}_{A,1}$, $\hat{y}_{A,2}$, $\hat{y}_{A,3}$, and $\hat{y}_{A,4}$ are available for track 902 and position estimates $\hat{y}_{B,1}$, $\hat{y}_{B,2}$, $\hat{y}_{B,3}$, and $\hat{y}_{B,4}$ are available for track 904. Then, the averaged position estimate for track 902 may be obtained as $$\hat{y}_A = \frac{1}{8}\sum_{i=1}^{4} \hat{y}_{A,i} + (\hat{y}_{B,i} - d).$$

In the above equation averaging is performed across eight position estimates instead of just four and accordingly the accuracy of the averaged position estimate may be improved.

In accordance with some embodiments of the present disclosure, the distance d between first read head 916 and second read head 918 may not be known. In such embodiments, a distance estimate $\hat{d}$ may be obtained from the position estimates using $$\hat{d} = \frac{1}{N}\sum_{i=1}^{N} \hat{y}_{A,i} - \hat{y}_{B,i},$$

where N denotes the number of available position estimates.

In accordance with some embodiments of the present disclosure, calibration may be performed between write head 104 and each of read heads 106. Performing such calibration may generally enhance the accuracy with which tracks are recorded on the medium. However, in TDMR systems, such calibration may also serve the purpose of recording adjacent tracks in a way that pre-compensates for the time delay introduced by the skewed arrangement of the readers.

In some implementations, the time offset between write head 104 and read heads 106 may be determined by recording a track using a set of predefined parameters, such as a predefined phase offset compared to a read clock, a predefined number of symbols between the SAM and the first bit of the data region, a predefined offset between write head 104 and read heads 106, or any other suitable parameter. The recorded track may then be retrieved using read heads 106, and by comparing the time and phase offsets between the recorded signal and the retrieved signals, the reader-to-write gap may be determined and expressed as a reader-to-writer time offset and as a reader-to-write phase offset.

In some implementations, the reader-to-writer time offset may be determined at initial calibration by recording a pseudo-random bit sequence, reading back the recorded pseudo-random bit sequence, and determining the time delay between a servo synchronization mark (e.g., the SAM) and a data synchronization mark (e.g., the DAM). The time difference between the servo and data synchronization marks is sufficient for determining the reader-to-writer time offset with symbol-level resolution. However, additional calibration may be required to determine the reader-to-writer phase offset.

In some implementations, the reader-to-writer phase offset may be determined both during initial calibration and during operation of hard disk 102. A long preamble pattern may be recorded on a track, the track may be read back, and phase values for the retrieved symbols may be determined. The demodulated phase values may be sufficient for determining the reader-to-writer phase offset. Alternatively or additionally, the phase modulation may be carried out by using a Fourier transform (e.g., employing HSC blocks or similar processing circuitry configured to process the WZPS field). Loopback calibration procedure 700 may be used as part of the demodulation process.

In some implementations, the reader-to-writer time offset and the reader-to-writer phase offset may be determined for each of the first read head and the second read head. For example, the procedures described above may be applied for the first read head and the second read head separately. Accordingly, first reader-to-writer time and phase offsets and second reader-to-writer time and phase offsets may be determined. Performing the calibration for both read heads enables write controller 122 to record adjacent tracks by purposefully misaligning them in accordance with the reader-to-reader time and phase offset of first read head 106a and second read head 106b. The reader-to-write time and phase offsets may be required in order to perform such recording with sufficient accuracy. Pre-compensation of the time and phase offsets between read heads 106 may improve the performance of hard disk system 100 because the amount of time-misalignment may be reduced. In some implementations, cancellation of cross-track interference during the retrieval of data from hard disk 102 may therefore be performed more accurately.

Figure 10:
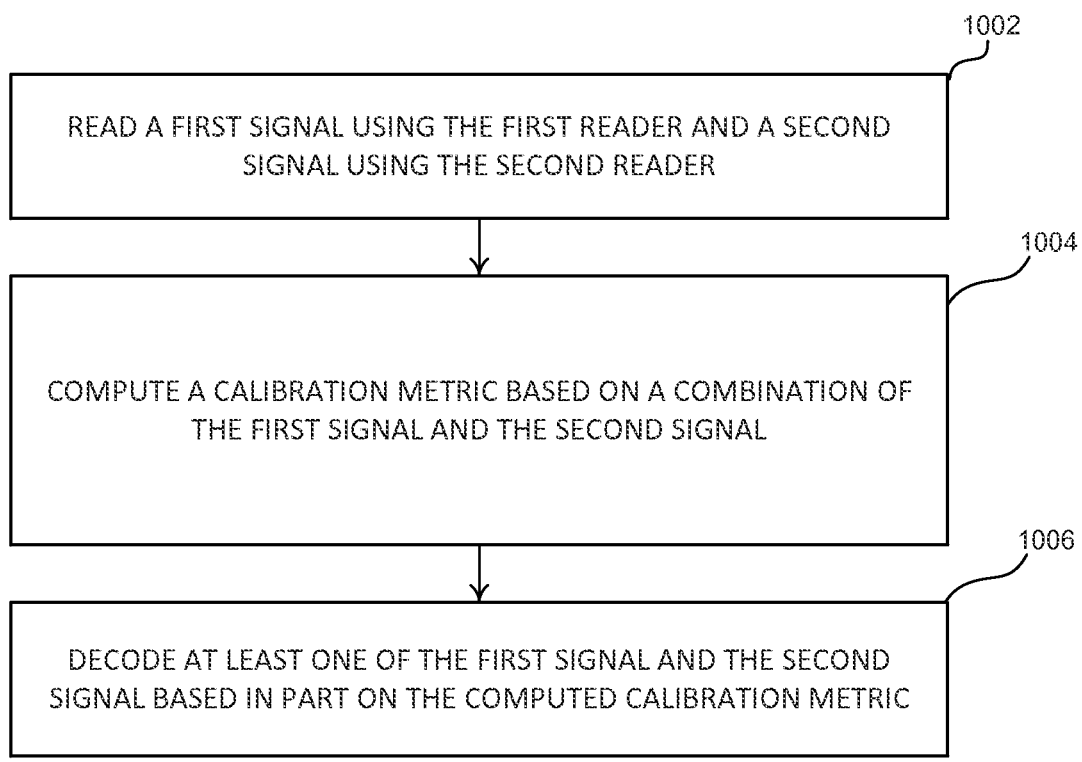
FIG. 10 is a high-level flow diagram of a method for calibrating signals retrieved from a storage device, in accordance with some embodiments of the present disclosure.

FIG. 10 is a high-level flow diagram of a process 1000 for calibrating signals retrieved from a storage device, in accordance with some embodiments of the present disclosure. Calibration circuitry 120 may execute process 1000 by, at 1002, reading a first signal using a first reader and a second signal using a second reader. Process 1000 may, at 1004, compute a calibration metric associated with the first reader and the second reader based on a combination of the first signal and the second signal. At 1006, process 1000 may decode at least one of the first signal and the second signal based in part on the computed calibration metric.

At 1002, a first signal is read using first read head 106a and a second signal is read using second read head 106b. As is described in relation to FIG. 1, the first signal and the second signal may be respectively preprocessed by preprocessing circuitry 115 and 117 to make them suitable for use by calibration circuitry 120. The preprocessing may include amplification, attenuation, conversion of a signal format, or any other suitable transformation.

At 1004, process 1000 may compute a calibration metric associated with the first reader and the second reader based on a combination of the first signal and the second signal. In some implementations, the computation of the calibration metric may be performed by calibration circuitry 120. Calibration circuitry 120 may compute a cross-correlation function based on the first signal and the second signal. Calibration circuitry 120 may then identify peaks of the cross-correlation function to estimate the time offset, i.e., the integer component of time delay 444. The cross-correlation function may be computed for specific portions of the first and second signals. For example, a pseudo-random bit sequence with favorable cross-correlation properties may be recorded on the medium and retrieved by the first reader and the second reader to form the first signal and the second signal, respectively. Alternatively or additionally, time delays between the SAM and the DAM may be determined for the first and second reader. Calibration circuitry 120 may then compare these time delays to determine the time offset.

Alternatively or additionally, calibration circuitry 120 may determine phase offsets associated with symbols of the first signal and the second signal. In some implementations, calibration circuitry 120 may retrieve a common preamble pattern, such as the WZPS field, using the first and second read heads. A phase value may then be computed for each symbol of the resulting first and second signals. Alternatively or additionally, the phase values may be expressed using sine and cosine components. The values of components may then be averaged across the symbols of the common preamble pattern to obtain an average phase value for each of the signals. The phase offset may then be obtained by computing the difference between the averaged phase values of the first and second signals. In some implementations, phase values and phase offset estimates may be obtained using a loopback procedure, rather than by utilizing a common preamble pattern. For example, a track may be written using a shingled writer that is wide enough to be concurrently read by both the first read head and the second read head. Similar to when a common preamble pattern is used, phase values may be obtained for the symbols read from the track, the phase values may be averaged, and the phase offset may be computed as the difference between the averaged phase values.

At 1006, process 1000 decodes at least one of the first signal and the second signal based in part on the computed calibration metric. As is discussed in relation to FIG. 1, the decoding may be performed by decoding circuitry 126 based on first signal 115 and second signal 117, after suitable pre-processing. Decoding circuitry 126 may further utilize information about the time offset and/or the phase offset to improve the decoding performance compared to a decoder that does not take such calibration parameters into account. For example, decoding circuitry 126 may utilize time offset and phase offset to estimate the amount of leakage that is introduced by a symbol of the first signal on a symbol of the second signal. The resulting estimate of this cross-track interference may be used to cancel interference between the first signal and the second signal and may thus improve the effective signal-to-noise ratio of both the first signal and the second signal.

Figure 11:
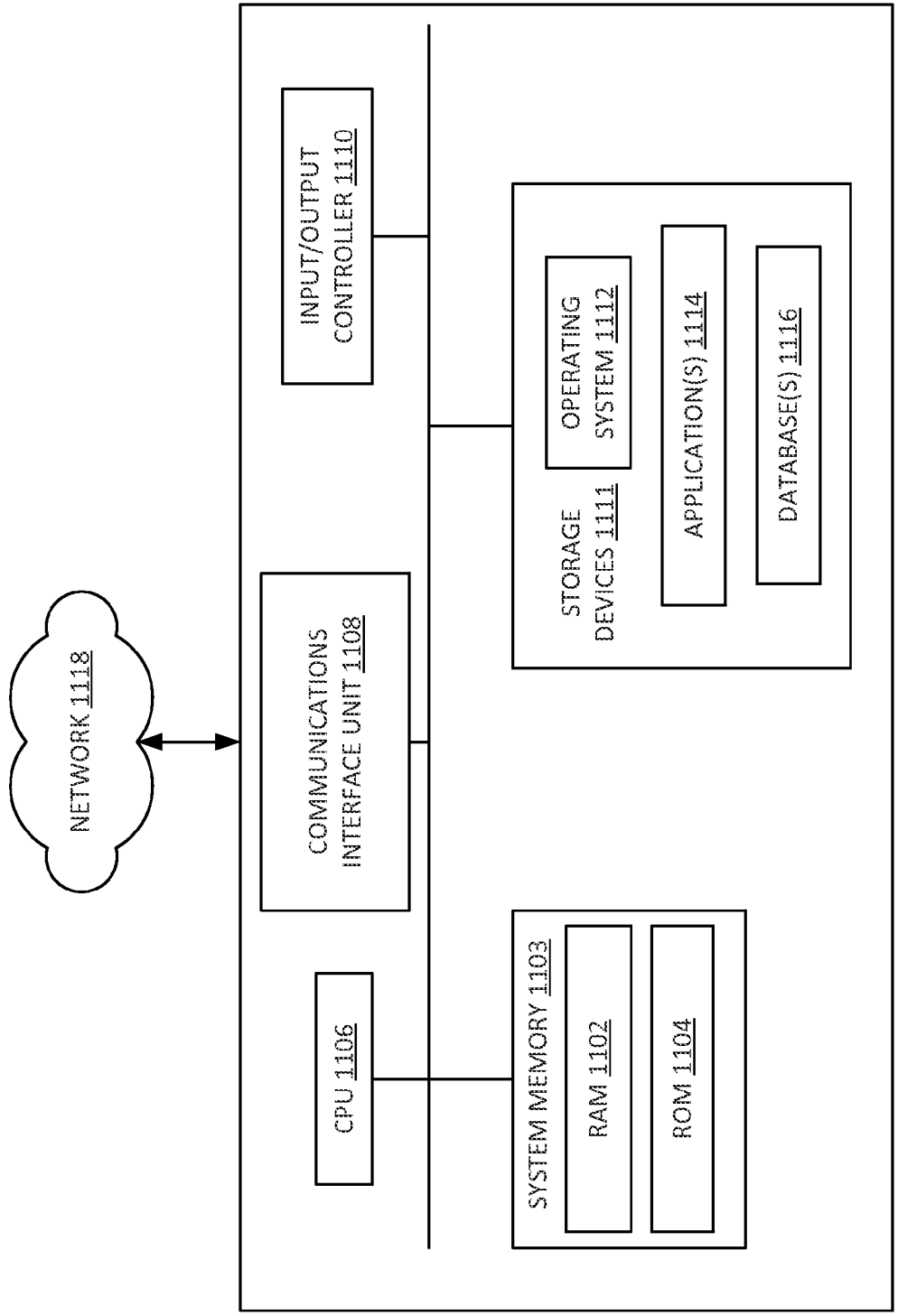
FIG. 11 shows a block diagram of a computing device, for performing any of the processes described herein, in accordance with some embodiments of the present disclosure.

FIG. 11 is a block diagram 1100 of a computing device, such as any of the components of the system of FIG. 1, for performing any of the processes described herein, in accordance with an embodiment of the disclosure. Each of the components of these systems may be implemented on one or more computing devices 1100. In certain aspects, a plurality of the components of these systems may be included within one computing device 1100. In certain embodiments, a component and a storage device 1111 may be implemented across several computing devices 1100.

The computing device 1100 comprises at least one communications interface unit 1108, an input/output controller 1110, system memory 1103, and one or more data storage devices 1111. The system memory 1103 includes at least one random access memory (RAM 1102) and at least one read-only memory (ROM 1104). All of these elements are in communication with a central processing unit (CPU 1106) to facilitate the operation of the computing device 1100. The computing device 1100 may be configured in many different ways. For example, the computing device 1100 may be a conventional standalone computer or alternatively, the functions of computing device 1100 may be distributed across multiple computer systems and architectures. In FIG. 11, the computing device 1100 is linked, via network 1118 or local network, to other servers or systems.

The computing device 1100 may be configured in a distributed architecture, wherein databases and processors are housed in separate units or locations. Some units perform primary processing functions and contain at a minimum a general controller or a processor and a system memory 1103. In distributed architecture embodiments, each of these units may be attached via the communications interface unit 1108 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 1106 comprises a processor, such as one or more conventional microprocessors and one or more supplementary co-processors such as math co-processors for offloading workload from the CPU 1106. The CPU 1106 is in communication with the communications interface unit 1108 and the input/output controller 1110, through which the CPU 1106 communicates with other devices such as other servers, user terminals, or devices. The communications interface unit 1108 and the input/output controller 1110 may include multiple communication channels for simultaneous communication with, for example, other processors, servers or client terminals.

The CPU 1106 is also in communication with the data storage device 1111. The data storage device 1111 may comprise an appropriate combination of magnetic, optical or semiconductor memory, and may include, for example, RAM 1102, ROM 1104, flash drive, an optical disc such as a compact disc or a hard disk or drive. The CPU 1106 and the data storage device 1111 each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 1106 may be connected to the data storage device 1111 via the communications interface unit 1108. The CPU 1106 may be configured to perform one or more particular processing functions.

The data storage device 1111 may store, for example, (i) an operating system 1112 for the computing device 1100; (ii) one or more applications 1114 (e.g., computer program code or a computer program product) adapted to direct the CPU 1106 in accordance with the systems and methods described here, and particularly in accordance with the processes described in detail with regard to the CPU 1106; or (iii) database(s) 1116 adapted to store information that may be utilized to store information required by the program.

The operating system 1112 and applications 1114 may be stored, for example, in a compressed, an uncompiled and an encrypted format, and may include computer program code. The instructions of the program may be read into a main memory of the processor from a computer-readable medium other than the data storage device 1111, such as from the ROM 1104 or from the RAM 1102. While execution of sequences of instructions in the program causes the CPU 1106 to perform the process steps described herein, hardwired circuitry may be used in place of, or in combination with, software instructions for embodiment of the processes of the present disclosure. Thus, the systems and methods described are not limited to any specific combination of hardware and software.

Suitable computer program code may be provided for performing one or more functions in relation to calibrating signals retrieved from a storage device using a first reader and a second reader, as described herein. The program also may include program elements such as an operating system 1112, a database management system and "device drivers" that allow the processor to interface with computer peripheral devices (e.g., a video display, a keyboard, a computer mouse, etc.) via the input/output controller 1110.

The term "computer-readable medium" as used herein refers to any non-transitory medium that provides or participates in providing instructions to the processor of the computing device 1100 (or any other processor of a device described herein) for execution. Such a medium may take many forms, including, but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer may read.

Various forms of computer readable media may be involved in carrying one or more sequences of one or more instructions to the CPU 1106 (or any other processor of a device described herein) for execution. For example, the instructions may initially be borne on a magnetic disk of a remote computer (not shown). The remote computer may load the instructions into its dynamic memory and send the instructions over an Ethernet connection, cable line, or even telephone line using a modem. A communications device local to a computing device 1100 (e.g., a server) may receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

The foregoing is merely illustrative of the principles of this disclosure and various modifications can be made without departing from the scope of the present disclosure. The above described embodiments of the present disclosure are presented for purposes of illustration and not of limitation, and the present disclosure is limited only by the claims which follow.

What is claimed is:

1. A method for calibrating signals retrieved from a storage device using a first reader and a second reader, the method comprising:
   reading, using control circuitry, a first signal using the first reader and a second signal using the second reader;
   computing, using the control circuitry, a calibration metric based on a combination of the first signal and the second signal, wherein computing the calibration metric comprises:
      correlating a first portion of the first signal and a second portion of the second final to obtain a cross-correlation sequence,
      detecting a peak in the cross-correlation sequence, and
      computing a time offset based on the detected peak of the cross-correlation sequence; and
   decoding at least one of the first signal and the second signal based in part on the computed calibration metric.

2. The method of claim 1, wherein:
   the first signal is associated with a first track of the storage device; and
   the second signal is associated with a second track of the storage device.

3. The method of claim 1, wherein computing the calibration metric further comprises:
   determining a first time period ranging from the first reader detecting a servo address mark to the first reader detecting a data address mark;
   determining a second time period ranging from the second reader detecting the servo address mark to the second reader detecting the data address mark; and
   computing the time offset based on the first time period and the second time period.

4. The method of claim 1, wherein the first portion and the second portion correspond to one of a pseudo-random bit sequence and a sector sync marker.

5. The method of claim 1, wherein computing the calibration metric comprises:
   computing a phase relation between the first portion of the first signal and the second portion of the second signal to obtain a phase shift between the first reader and the second reader; and
   determining the time offset based on the phase shift.

6. The method of claim 1, wherein the calibration metric comprises a cross-track distance between the first reader and the second reader, and computing the calibration metric further comprises:
   estimating a position offset of the first reader relative to the second reader based on a reference signal; and
   computing an average of the position offset of the first reader relative to the second reader to obtain the calibration metric.

7. The method of claim 6, wherein the averaged position offset is used to improve an accuracy of a position estimation signal (PES).

8. The method of claim 1, further comprising:
writing, using the control circuitry, a third signal to the storage device based on the calibration metric.

9. The method of claim 1, wherein the decoding comprises performing joint decoding of the first signal and the second signal based on the calibration metric.

10. The method of claim 1, wherein the calibration metric is a first calibration metric, the method further comprising:
computing a second calibration metric associated with a writer and at least one of the first reader and the second reader; and
recording data on the storage device using the writer based on the second calibration metric.

11. A system for calibrating signals retrieved from a storage device, the system comprising:
a first reader configured to read a first signal;
a second reader configured to read a second signal;
control circuitry configured to compute a calibration metric based on a combination of the first signal and the second signal by:
correlating a first portion of the first signal and a second portion of the second final to obtain a cross-correlation sequence,
detecting a peak in the cross-correlation sequence, and
computing a time offset based on the detected peak of the cross-correlation sequence; and
a decoder configured to decode at least one of the first signal and the second signal based in part on the computed calibration metric.

12. The system of claim 11, wherein:
the first signal is associated with a first track of the storage device; and
the second signal is associated with a second track of the storage device.

13. The system of claim 11, wherein the control circuitry is further configured to:
determine a first time period ranging from the first reader detecting a servo address mark to the first reader detecting a data address mark;
determine a second time period ranging from the second reader detecting the servo address mark to the second reader detecting the data address mark; and
compute the time offset based on the first time period and the second time period.

14. The system of claim 11, wherein the first portion and the second portion correspond to one of a pseudo-random bit sequence and a sector sync marker.

15. The system of claim 11, wherein the control circuitry is further configured to:
compute a phase relation between the first portion of the first signal and the second portion of the second signal to obtain a phase shift between the first reader and the second reader; and
determine the time offset based on the phase shift.

16. The system of claim 11, wherein the calibration metric comprises a cross-track distance between the first reader and the second reader, and the control circuitry is further configured to:
estimate a position offset of the first reader relative to the second reader based on a reference signal; and
compute an average of the position offset of the first reader relative to the second reader to obtain the calibration metric.

17. The system of claim 16, wherein the control circuitry is further configured to improve an accuracy of a position estimation signal (PES) using the averaged position offset.

18. The system of claim 11, wherein the control circuitry is further configured to:
write a third signal to the storage device based on the calibration metric.

19. The system of claim 11, wherein the control circuitry is configured to perform the decoding by performing joint decoding of the first signal and the second signal based on the calibration metric.

20. The system of claim 11, wherein the calibration metric is a first calibration metric, and the control circuitry is further configured to:
compute a second calibration metric associated with a writer and at least one of the first reader and the second reader; and
record data on the storage device using the writer based on the second calibration metric.

* * * * *